Feb. 19, 1929.　　　　　　　　　　　　　　　　1,702,516
E. C. MOGFORD
AXLE FOR MOTOR VEHICLES
Filed May 7, 1925　　　2 Sheets-Sheet 1
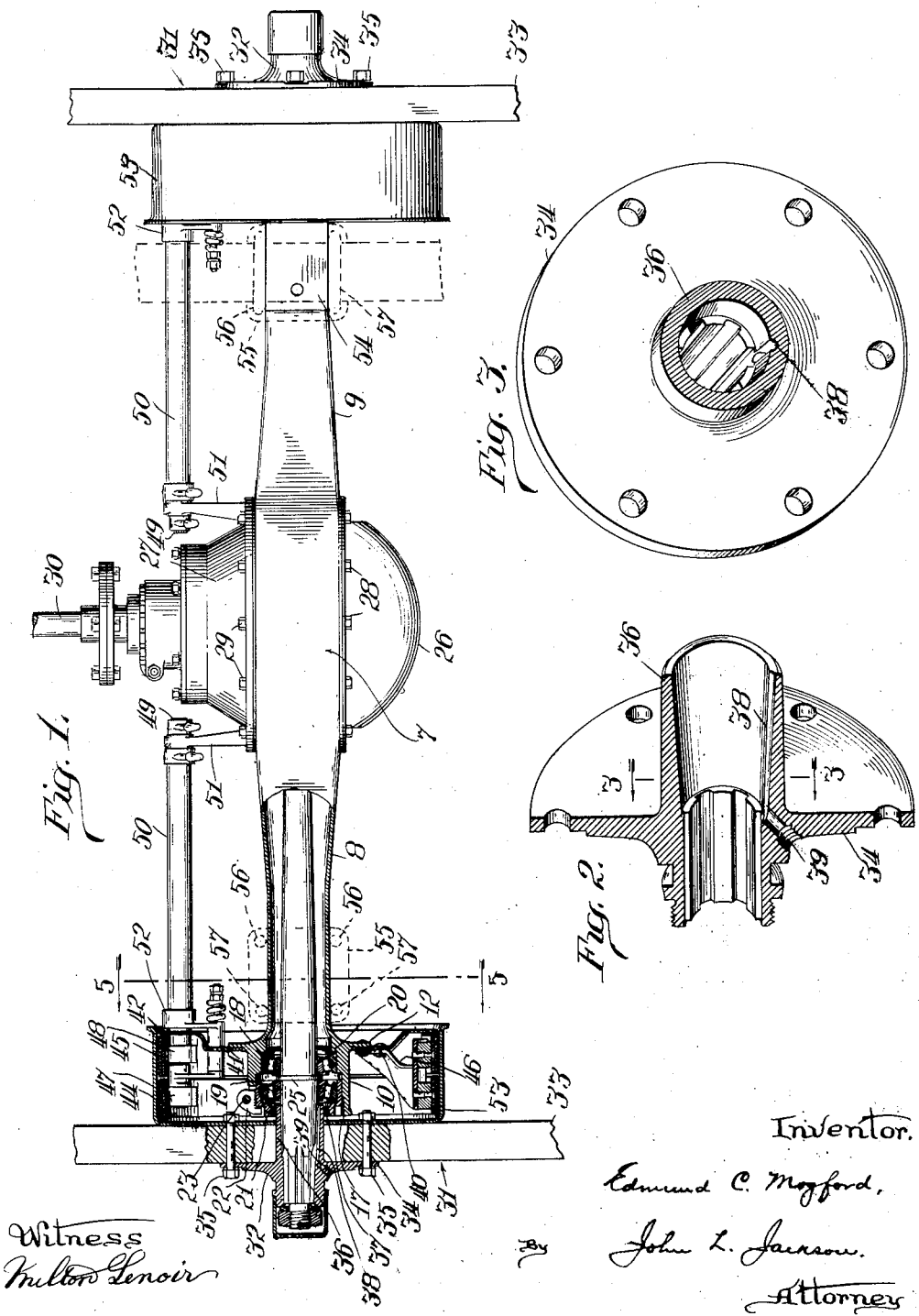
Inventor.
Edmund C. Mogford,
John L. Jackson.
Attorney
Witness
Milton Lenoir

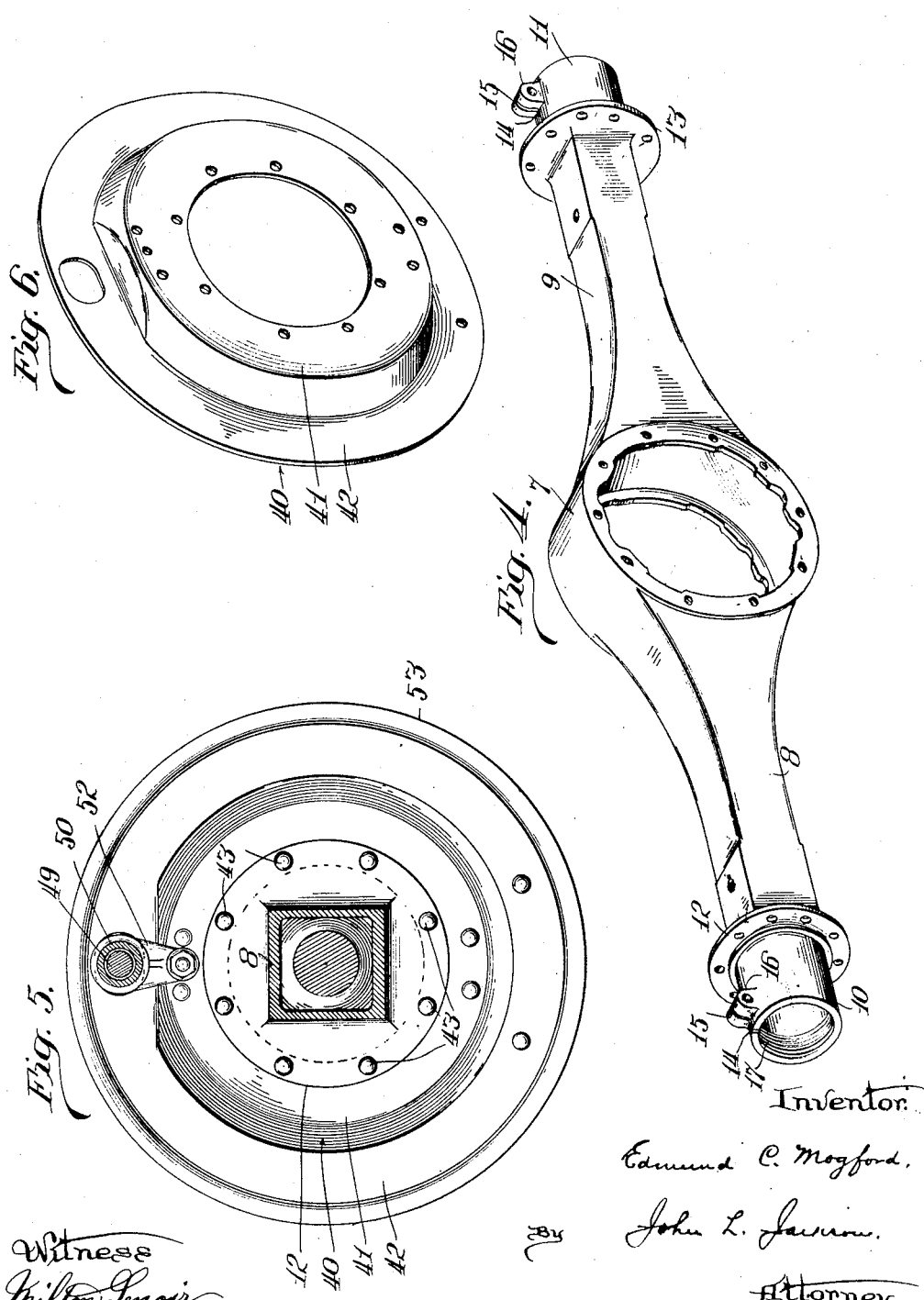

Patented Feb. 19, 1929.

1,702,516

UNITED STATES PATENT OFFICE.

EDMUND C. MOGFORD, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR VEHICLES.

Application filed May 7, 1925. Serial No. 28,599.

My invention relates to axles for automobiles, trucks, and other motor vehicles, and has particularly to do with axles comprising two axle members driven by differential gearing, and having propelling wheels mounted on their outer ends, the axle members and differential gearing being enclosed in a housing which at its outer end portions forms a support for braking devices arranged to act on brake drums carried by the propelling wheels. It has for its object to provide certain improvements in the construction of the housing for the axle members; to provide improved means for rotatably supporting the outer end portions of the axle members in said housing; to provide improved brake supporting devices; and to provide improved means for lubricating the bearings for the outer end portions of the axle members. This object I accomplish as illustrated in the drawings and hereinafter described. What I regard as new is set forth in the claims.

In the accompanying drawings,—

Fig. 1 is a plan view of the rear axle of a motor vehicle embodying my improvements, some parts being in section;

Fig. 2 is an enlarged sectional view illustrating the construction of the wheel hubs;

Fig. 3 is a section on line 3—3 of Fig. 2;

Fig. 4 is a perspective view of the rear axle housing;

Fig. 5 is a vertical section on line 5—5 of Fig. 1; and

Fig. 6 is a perspective view of the brake supporting member showing the inner face thereof.

An important part of my present invention is the construction of the rear axle housing, which is best shown in Figs. 1 and 4. Said housing comprises a substantially cylindrical central portion 7 from which tubular portions 8, 9 extend in opposite directions. Said tubular portions are provided at their outer ends with sleeve portions 10, 11, at the inner ends of which are radial flanges 12, 13. These parts are all cast in one piece, the housing being a unit from end to end. The outer margins of the sleeve portions 10, 11 are split, as shown at 14 in Fig. 4, and are provided with bosses 15, 16 at opposite sides of the slit, which are adapted to receive a bolt so that said sleeve portions may be clamped upon the bearings hereinafter described. Also, said sleeve portions are internally threaded adjacent to their outer ends, as shown at 17 in Fig. 4. Each of these sleeve portions is adapted to receive and support two anti-friction bearings 18, 19, preferably of the roller type, the bearing 18 being fitted into a seat at the inner end of the sleeve and abutting against an integral shoulder 20 provided therein, as best shown in Fig. 1, while the bearing 19 is carried in an externally screw-threaded collar 21 which screws into the outer end of the sleeve, as also shown in said figure. A key 22, which is mounted on the clamping bolt 23, which fits in the lugs 15, 16, serves to engage the collar 21 and prevent accidental unscrewing thereof, as clearly shown at the left in Fig. 1.

The anti-friction bearings 18, 19 support the outer end portions of the axle members, one of which is shown at 24 in Fig. 1, from which it will be seen that each axle member is provided with a radial flange 25 which fits between the two anti-friction bearings so that endwise movement of the axle member is prevented. It will be understood, of course, that the inner end of the axle member is geared in any suitable way to the usual differential gearing which is mounted in the cylindrical portion 7 of the housing and is enclosed at the rear by a cap plate 26 and at the front by a plate 27, which plates are bolted to opposite sides of the cylindrical portion of the housing by bolts 28, 29, respectively. The differential gearing is driven from the motor by the usual propeller shaft 30.

Heretofore it has been customary to construct the rear axle housing, by which I mean the central portion which receives the differential gearing and the tubular portions which enclose the axle members and support the bearings for the outer ends thereof, in several pieces, the axle bearings being mounted in end pieces formed separately from the main body of the houisng and brazed or riveted thereon. This construction is objectionable because it involves considerable machine work and increases the weight of the housing as a whole, both of which materially increase the cost of manufacture, and these objections are overcome and a much better axle housing produced by casting the entire housing in one piece from end to end, as above described.

The propelling wheels are mounted upon the outer end portions of the axle members 24 and are keyed thereto in any suitable way so as to rotate therewith. Said wheels are shown in Fig. 1, where they are indicated by the reference numeral 31, the hubs of said wheels being indicated by 32, and their spokes by 33. The hub 32 of each wheel is provided with a radial flange 34 which is secured to the spokes by bolts 35, and with an axially disposed sleeve 36 which fits upon the axle member 24 and extends into the collar 21, terminating adjacent to the anti-friction bearing 19, as best shown in Fig. 1. A felt washer 37 is fitted in a suitable annular recess in said collar and bears upon the outer surface of the sleeve 36, to protect the anti-friction bearings by excluding dust and also to prevent the escape of lubricant from the chamber in which said bearings are mounted. The sleeve 36 is provided with a longitudinally extending tapered groove 38 on its inner surface, which groove extends from an externally accessible filling opening 39 through the base of the flange 34, as best shown in Figs. 1 and 2, to the inner end of the sleeve 36, the taper of said groove being such that it grows gradually deeper as it approaches the anti-friction bearings. In other words, it forms an inclined duct which leads from the filling opening 39 to the anti-friction bearings. Consequently oil introduced through the filling opening 39 passes freely to said bearings, and does not run out into the outer end of the hub. The filling opening 39 is screw-threaded as shown in Fig. 2 so that it may be closed by a plug or other suitable cap.

The radial flange 12 of the axle housing is provided to furnish a support for a brake supporting disc 40, the construction of which is best shown in Figs. 1, 5 and 6. Said disc is circular in contour and is dished so that its central portion 41 is considerably nearer the adjacent end of the axle than its outer portion 42. In other words, the disc, roughly speaking, may be said to be concavo-convex, although both the inner and outer portions thereof are preferably flattened, as illustrated in Fig. 1. The disc 40 is firmly secured to the flange 12 by bolts 43, and in the illustrated construction it forms a support for two expanding brake bands 44, 45, and for devices by which said brake bands are operated. Said brake bands are supported intermediately by a bracket 46 secured to the disc 40, as shown in Fig. 1, and are provided with separable ends which may be forced apart to set the brake or drawn together to release it by any suitable mechanism. Such mechanism forms no part of my present invention, and, therefore, is not shown in detail herein. It is, however, fully shown and described in my application of even date herewith, Serial No. 28,598. For present purposes it will suffice to say that said brakes are normally retracted by suitable springs and are expanded by rocking cams 47, 48 carried respectively by concentric shafts 49, 50, which are supported by outer brackets 52 carried by the disc 40, and by inner brackets 51 carried by the axle housing as best shown in Fig. 1. The brake bands 44, 45 lie within a brake drum 53 which is secured to the vehicle wheel in the usual way, and by their expansion are adapted to engage the inner surface of said drum for braking purposes. The brakes are, of course, separately operable, one of them being used as a service brake and the other as an emergency brake.

The purpose of making the disc 40 dished in form is to permit the usual spring seats to be placed nearer to the bearings for the outer end portions of the axle members, and thereby make practicable the use of narrow bearings, which reduces manufacturing costs. As is understood by those familiar with the art, the rear springs of the vehicle are usually mounted on the rear axle housing, and it is considered highly desirable to position such spring seats as near as possible to the axle bearings. As the springs are connected to such spring seats by U-bolts it is necessary to so locate such seats that the nuts of such bolts are accessible so that they can be manipulated, as is occassionally necessary for purposes of repair, &c., but prior to my invention the brake supporting devices have been of such design that it has been necessary to locate the spring seats further from the axle bearings than is desirable. By supporting the brakes, however, on dished discs as described, I have made it practicable to place the spring seats considerably closer to the axle bearings, thereby realizing the advantages above indicated. In the drawings I have indicated the position of the spring seats in dotted lines, 54 indicating a flattened surface provided at the upper sides of the tubular portions 8, 9 of the axle housing, and 55 the usual plate which underlies the housing under the spring seats, and is provided with bolt holes 56, 57, for the reception of the usual U-bolts which clamp the springs in position. It will be noted that the outer bolt holes 57 are very close to the vertical plane of the outer marginal portion of the disc 40, but are a considerable distance from the flange 12 so that there is plenty of space for the use of a wrench in screwing and unscrewing the nuts on said bolts.

The tubular portions 8, 9 of the axle housing are preferably rectangular in cross-section, but obviously they may be made of any other desired contour. Also, while I prefer to design the sleeve portions 10, 11 to receive two anti-friction bearings as shown, it is not essential that two of such bearings be used as each of said sleeve portions may be designed to receive only a single bearing.

What I claim as my invention and desire to secure by Letters Patent, is—

1. The combination with an axle housing comprising a central portion for receiving differential gearing and laterally extending tubular portions having sleeve portions at their outer ends arranged to receive and support axle bearings, of wheels, each of said wheels having a hub comprising a sleeve adapted to extend into the adjacent sleeve portion of said housing, said hub sleeve having an inclined oil duct extending longitudinally thereof from the outer side of said wheel to the sleeve portion of said housing.

2. The combination with an axle housing comprising a central portion for receiving differential gearing and laterally extending tubular portions having sleeve portions at their outer ends arranged to receive and support axle bearings, of wheels, each of said wheels having a hub comprising a sleeve adapted to extend into the adjacent sleeve portion of said housing, said hub sleeve having an inclined tapered oil duct extending longitudinally thereof from the outer side of said wheel to the sleeve portion of said housing.

3. In combination, an axle housing comprising a central portion for enclosing differential gearing and tubular portions extending laterally therefrom, a driving axle disposed in each of said tubular portions, a wheel mounted concentrically on the outer end of each of said driving axles to be driven thereby, a sleeve extension formed integral with the outer end of each of said tubular portions and spaced from said driving axle, two thrust resisting anti-friction bearings interposed between said axle and said sleeve extension, a flange on said axle engaging between the inner races of said anti-friction bearings for transmitting end thrust in either direction thereto, the outer ends of said sleeve extensions being internally screw threaded and being split and provided with clamping means.

4. In combination, an axle housing comprising a central portion for enclosing differential gearing and tubular portions extending laterally therefrom, a driving axle disposed in each of said tubular portions, a wheel mounted concentrically on the outer end of each of said driving axles to be driven thereby, a sleeve extension on the outer end of each of said tubular portions and spaced from said driving axle, two thrust resisting anti-friction bearings interposed between said axle and said sleeve extension, a flange on said axle engaging between the inner races of said anti-friction bearings for transmitting end thrust in either direction thereto, the outer ends of said sleeve extensions being internally screw threaded and being split, a threaded collar screwing into the threaded outer end of each sleeve extension and cooperating with said bearings for holding the same in place, and clamping means cooperating with the split ends of said sleeve extensions for holding said collars in place.

5. In combination, an axle housing comprising a central portion for enclosing differential gearing and tubular portions extending laterally therefrom, a driving axle disposed in each of said tubular portions, a wheel mounted concentrically on the outer end of each of said driving axles to be driven thereby, a sleeve extension on the outer end of each of said tubular portions and spaced from said driving axle, two thrust resisting anti-friction bearings interposed between said axle and said sleeve extension, a flange on said axle engaging between the inner races of said anti-friction bearings for transmitting end thrust in either direction thereto, the outer ends of said sleeve extensions being internally screw threaded and being split and provided with clamping means, and radial flanges adjacent to the inner ends of said sleeve extensions for supporting brake supporting discs.

6. In combination, an axle housing comprising a central portion for enclosing differential gearing and tubular portions extending laterally therefrom, a driving axle disposed in each of said tubular portions, a wheel mounted concentrically on the outer end of each of said driving axles to be driven thereby, a sleeve extension formed integral with the outer end of each of said tubular portions and spaced from said driving axle, two thrust resisting anti-friction bearings interposed between said axle and said sleeve extension, a flange on said axle engaging between the inner races of said anti-friction bearings for transmitting end thrust in either direction thereto, the outer ends of said sleeve extensions being internally screw threaded and being split and provided with clamping means, brake supporting discs mounted on said tubular portions adjacent to the inner ends of said sleeve extensions, and spring seats on said tubular portions in close proximity to said discs, said discs being dished away from said spring seats to facilitate the bolting of vehicle springs thereto.

7. In combination, an axle housing comprising a central portion for enclosing differential gearing and tubular portions extending laterally therefrom, a driving axle disposed in each of said tubular portions, a wheel mounted concentrically on the outer end of each of said driving axles to be driven thereby, a sleeve extension formed integral with the outer end of each of said tubular portions and spaced from said driving axle, and two thrust resisting anti-friction bearings interposed between said axle and said sleeve extension, the outer ends of said sleeve extensions being internally screw threaded and being split and provided with clamping means.

8. In combination, an axle housing comprising a central portion for enclosing differential gearing and laterally extending tubular portions integral with said central portion, a driving axle disposed in each of said tubular portions, a wheel mounted concentrically on the outer end of each of said driving axles to be driven thereby, sleeve extensions formed integral with the outer ends of said tubular portions, each sleeve extension being of enlarged internal diameter to form an internal shoulder adjacent to the inner end of said sleeve, two thrust resisting antifriction bearings interposed between said axle and each sleeve extension, said internal shoulder having thrust resisting coaction with the outer race of the innermost bearing, a flange on each axle engaging between the inner races of said anti-friction bearings for transmitting end thrust thereto in either direction, and means carried by each sleeve extension and having thrust resisting coaction with the outer flange of each outer bearing.

9. In combination, an axle housing comprising a central portion for enclosing a differential gearing and laterally extending tubular portions, a driving axle disposed in each of said tubular portions, a wheel mounted concentrically on the outer end of each of said driving axles to be driven thereby, sleeve extensions on the outer ends of said tubular portions, each sleeve extension being of enlarged internal diameter to form an internal shoulder adjacent to the inner end of said sleeve, two thrust resisting anti-friction bearings interposed between said axle and each sleeve extension, said internal shoulder having thrust resisting coaction with the outer race of the innermost bearing, means carried by each axle engaging between the inner races of said anti-friction bearings for transmitting end thrust thereto in either direction, means carried by each sleeve extension and having thrust resisting coaction with the outer race of each outer bearing, radial flanges on said tubular portions adjacent to the inner ends of said sleeve extensions, and brake supporting discs mounted on said radial flanges.

10. In a driving axle, the combination of an axle housing comprising a central portion for enclosing differential gearing and tubular portions extending laterally therefrom, axles extending through said tubular portions, bearing containing members integral with said tubular portions and spaced from said axles, a pair of antifriction bearings interposed between each of said axles and the adjacent bearing containing member, a flange on each axle disposed between the bearings of each pair, and a releasable member carried by said bearing containing member for holding said bearings in place, one of the said members being screw-threaded and being split and provided with clamping means.

11. In a driving axle, the combination of an axle housing comprising a central portion for enclosing differential gearing and tubular portions extending laterally therefrom, an axle extending through each of said tubular portions, a bearing containing member integral with the outer end of each of said tubular portions and spaced from said axle, the said bearing containing member being bored with different diameters, two anti-friction members interposed between said axle and said bearing containing member, a flange on said axle engaging between the inner races of said antifriction bearings for transmitting end thrust in either direction thereto, a shoulder formed by one of the diameters in said bearing containing member having thrust resisting coaction with the outer race of the inner bearing and a releasable member carried by the outer end of said bearing containing member having thrust resisting coaction with the outer race of the outer bearing, both of said members having cooperating screw threads permitting endwise adjustment of said releasable member, one of said members being split and provided with clamping means for rigidly fastening said members together.

EDMUND C. MOGFORD.